(12) United States Patent
Hassdenteufel et al.

(10) Patent No.: US 11,738,500 B2
(45) Date of Patent: Aug. 29, 2023

(54) METHOD FOR EMBOSSING A COMPONENT

(71) Applicant: Mahle International GmbH, Stuttgart (DE)

(72) Inventors: Klaus Hassdenteufel, Gerlingen (DE); Stefan Schill, Renningen (DE); Daniel Schleicher, Esslingen Neckar (DE)

(73) Assignee: Mahle International GmbH

( * ) Notice: Subject to any disclaimer, the term of this patent is extended or adjusted under 35 U.S.C. 154(b) by 502 days.

(21) Appl. No.: 16/821,989

(22) Filed: Mar. 17, 2020

(65) Prior Publication Data

US 2020/0298465 A1 Sep. 24, 2020

(30) Foreign Application Priority Data

Mar. 18, 2019 (DE) .......................... 102019203632.5

(51) Int. Cl.
*B29C 59/02* (2006.01)
*B29C 59/00* (2006.01)
*B29L 31/18* (2006.01)

(52) U.S. Cl.
CPC .......... *B29C 59/022* (2013.01); *B29C 59/005* (2013.01); *B29L 2031/18* (2013.01)

(58) Field of Classification Search
CPC ..... B29C 59/022; B29C 59/007; B21D 17/02; B23K 20/26; F16B 11/04; F16B 11/006
See application file for complete search history.

(56) References Cited

U.S. PATENT DOCUMENTS

| | | | |
|---|---|---|---|
| 3,650,006 A | 3/1972 | Kinkel | |
| 4,684,426 A * | 8/1987 | Takayama | B29C 70/80 428/187 |
| 9,153,837 B2 | 10/2015 | Mitsuda et al. | |
| 2006/0115323 A1* | 6/2006 | Coppeta | B81C 1/00095 403/270 |

FOREIGN PATENT DOCUMENTS

| | | |
|---|---|---|
| CN | 1522811 A | 8/2004 |
| CN | 201966205 U | 9/2011 |
| CN | 108632174 A | 10/2018 |

(Continued)

OTHER PUBLICATIONS

English abstract for DE-102017127429.
(Continued)

*Primary Examiner* — Francisco W Tschen
*Assistant Examiner* — Elisa H Vera
(74) *Attorney, Agent, or Firm* — Fishman Stewart PLLC

(57) ABSTRACT

The present disclosure concerns a method for embossing a component, a method for connecting a component to a second component via a substance-to-substance bond, and a device, e.g., a heat exchanger, having such a component. The method for embossing includes embossing a support groove into the component at least in some sections at a first surface portion of the component; embossing a functional groove into the component at the first surface portion; wherein the functional groove is arranged spaced apart from the support groove at least in some sections; and wherein the functional groove is formed for partially receiving a second component for a substance-to-substance bond.

20 Claims, 3 Drawing Sheets

(56) References Cited

FOREIGN PATENT DOCUMENTS

| | | |
|---|---|---|
| DE | 102011010317 A1 | 8/2012 |
| DE | 112010001565 T5 | 11/2012 |
| DE | 102017127429 A1 | 5/2019 |
| JP | 5373688 B2 | 12/2013 |
| KR | 20100011363 U | 11/2010 |

OTHER PUBLICATIONS

English abstract for DE-102011010317.
Chinese First Office Action and Search Report dated Sep. 6, 2021 corresponding to related Chinese Patent Application No. 202010186326.3.

* cited by examiner

METHOD FOR EMBOSSING A COMPONENT

CROSS-REFERENCE TO RELATED APPLICATION

This application claims priority to German Application No. DE 10 2019 203 632.5 filed on Mar. 18, 2019, the contents of which are hereby incorporated by reference in its entirety.

TECHNICAL FIELD

The present invention relates to a method for embossing a component and a method for the bonding of a first embossed component to a second component by means of a substance-to-substance bond. The present invention further relates to a device comprising at least one embossed component.

BACKGROUND

It is known from the prior art that a sheet metal part can have an embossed groove, into which a second component is inserted. A soldering of the sheet metal part to the second component is carried out subsequently, wherein a soldering agent is introduced in a soldering gap between the embossed groove of the sheet metal part and the second component. A design, which is suitable for soldering, requires small soldering gaps to ensure a sufficient capillary effect and a reliable soldering.

It is a disadvantage of the known embossing method that, due to the embossing pressure, a material portion of the sheet metal part flows transversely to the direction of action of the embossing pressure during the embossing of the groove. The groove thereby forms side walls, which are aligned obliquely to one another, so that the soldering gap between the groove and the second component is not constant and can have dimensions, which are disadvantageous for a reliable soldering. The same applies for adhesive bonds.

SUMMARY

The present invention is based on the object of specifying an embossing method of the above-mentioned type, in the case of which at least one groove is formed, which is optimized for a design, which is suitable for soldering or suitable for adhesion. The present invention is further based on the object of specifying an improved method for bonding a first embossed component to a second component by means of a substance-to-substance bond. The present invention is further based on the object of specifying a device comprising at least one embossed component, which is optimized for a design, which is suitable for soldering or suitable for adhesion.

This problem is solved according to the invention by means of the subject matters of the independent claim(s). Advantageous embodiments are subject matter of the dependent claims.

The present invention is based on the general idea that at least one support groove is inserted and/or introduced in the surrounding area of a functional groove, so as to reduce a flowing of a material portion of a component transversely to the direction of action of the embossing pressure.

The method according to the invention for embossing a component provides a component, which has at least a first surface portion and a second surface portion. The first surface portion and the second surface portion are located opposite one another and spaced apart from one another.

The distance between the first surface portion and the second surface portion can correspond to the wall thickness or the material thickness, respectively, of the component. The component can be formed as sheet metal part. A sheet metal part of this type can have a flat sheet metal portion at least in some sections and/or a curved sheet metal portion at least in some sections. The wall thickness of the component, in particular of the sheet metal part, can be smaller than the length of the component and/or smaller than the width of the component.

In the case of the method according to the invention it is provided that a first support groove is embossed into the component at least in some sections at the first surface portion. In the case of the method according to the invention it is provided that a functional groove is embossed into the component at the first surface portion, wherein the functional groove is arranged spaced apart from the first support groove at least in some sections. The functional groove is thereby formed for partially receiving a second component for a substance-to-substance bond.

The embossing of the first support groove and/or of the functional groove can take place in one production step or in several production steps. The embossing of the first support groove and/or of the functional groove can take place by sectional pressing in and/or sectional rolling the component.

A flowing of a material portion of the component parallel to the first surface portion or a flowing of the material portion parallel to a surface expansion direction of the first surface portion, respectively, can be reduced during the embossing of the functional groove by means of the first support groove. A flowing of a material portion of the component parallel to the first surface portion in the region between the first support groove can in particular be reduced during the embossing of the functional groove by means of the first support groove.

The functional groove thereby forms at least one side wall, which is optimized for a reliable substance-to-substance bond to a second component. If the second component is inserted into the functional groove, at least a virtually parallel or an essentially parallel soldering gap or adhesive gap, respectively, which is optimized for a design, which is suitable for soldering or suitable for adhesion, is created between the functional groove and the second component.

In the case of an advantageous further development of the solution according to the invention, it is provided that a second support groove is embossed into the component at least in some sections at the first surface portion, that the first support groove and the second support groove are arranged spaced apart from one another at least in some sections, that the functional groove is arranged between the first support groove and the second support groove at least in some sections and is arranged spaced apart from them.

In the case of the method according to the invention it is provided at a first support groove and a second support groove are embossed into the component at least in some sections at the first surface portion. The first support groove and the second support groove are arranged spaced apart from one another at least in some sections.

In the case of the method according to the invention it is provided that a functional groove is embossed into the component at the first surface portion, wherein the functional groove is arranged between the first support groove and the second support groove at least in some sections and is arranged spaced apart from them. The functional groove is thereby formed for partially receiving a second component for a substance-to-substance bond.

The embossing of the first support groove and/or of the second support groove and/or of the functional groove can take place in one production step or in several production steps. The embossing of the first support groove and of the second support groove can take place simultaneously. The embossing of the first support groove and of the second support groove and of the functional groove can take place simultaneously. The embossing of the first support groove and/or of the second support groove and/or of the functional groove can take place by sectional pressing in and/or sectional rolling of the component.

A flowing of a material portion of the component parallel to the first surface portion or a flowing of the material portion parallel to a surface expansion direction of the first surface portion, respectively, can be reduced during the embossing of the functional groove by means of the first support groove and/or the second support groove. A flowing of a material portion of the component parallel to the first surface portion in the region between the first support groove and/or the second support groove can in particular be reduced during the embossing of the functional groove by means of the first support groove and/or the second support groove.

The functional groove thereby forms side walls, which are optimized for a reliable substance-to-substance bond to a second component. If the second component is inserted into the functional groove, at least a virtually parallel or an essentially parallel soldering gap or adhesive gap, respectively, which is optimized for a design, which is suitable for soldering or suitable for adhesion, is created between the functional groove and the second component.

In the case of a further advantageous embodiment of the solution according to the invention it is provided that the functional groove is formed for partially receiving a second component for a soldering process and/or during a soldering process, and/or that the functional groove is formed for partially receiving a second component for an adhesive process and/or during an adhesive process.

In the case of an advantageous further development of the solution according to the invention it is provided that the first support groove and/or the second support groove have a cross sectional design and/or spacing to the functional groove, so that the first support groove and/or the second support groove reduce a flowing of a material portion of the component parallel to the first surface portion during the embossing of the functional groove. The first support groove and the second support groove can have an essentially identical cross sectional design and/or an essentially identical spacing to the functional groove. The advantage of this is that the cross sectional design and/or the spacing to the functional groove can be optimized as a function of the material.

The cross sectional design and/or the cross section of a support groove and/or the cross section of the functional groove is to be understood as the cross section of the respective groove transversely to its longitudinal expansion or transversely to its longitudinal direction of extension, respectively.

In the case of a further advantageous embodiment of the solution according to the invention it is provided that the embossing of the first support groove takes place by means of a first embossing tool portion, and/or wherein the embossing of the second support groove takes place by means of a second embossing tool portion, wherein the embossing of the functional groove takes place by means of a third embossing tool portion. The first embossing tool portion and the second embossing tool portion reduce a flowing of a material portion of the component parallel to the first surface portion during the embossing of the functional groove.

The first embossing tool portion can be formed complementary to the first support groove at least in some sections. The second embossing tool portion can be formed complementary to the second support groove at least in some sections. The third embossing tool portion can be formed complementary to the functional groove at least in some sections.

In the case of an advantageous further development of the solution according to the invention it is provided that the first embossing tool portion is in the first support groove and/or that the second embossing tool portion is in the second support groove during the embossing of the functional groove. A flowing of a material portion of the component parallel to the first surface portion is further reduced thereby.

In the case of a further advantageous embodiment of the solution according to the invention it is provided that the first support groove and/or the second support groove and the functional groove are aligned essentially parallel to one another at least in some sections. This can be understood such that a longitudinal direction of extension of the first support groove, a longitudinal direction of extension of the second support groove, and a longitudinal direction of extension of the functional groove are aligned parallel to one another at least in some sections in the context of production tolerances. A design of the functional groove, which is suitable for soldering, can thereby be ensured along its longitudinal direction of extension.

In the case of an advantageous further development of the solution according to the invention it is provided that, in the cross section, the functional groove has a first side wall and a second side wall, which are arranged spaced apart from one another and which are aligned essentially parallel to one another. The cross section of the functional groove is to be viewed transversely to its longitudinal expansion or transversely to its longitudinal direction of extension, respectively. The first side wall and a second side wall are connected via a front side. The first side wall and a second side wall can be aligned essentially transversely and/or perpendicular to the surface expansion direction of the first surface portion. The first side wall and a second side wall can be aligned essentially transversely and/or perpendicular to the front side. The distance between the first surface portion and the front side can define a depth of the functional groove. This depth of the functional groove can be used as tolerance compensation.

A solder gap comprising a constant dimension and/or constant gap width is formed by means of the essentially parallel first side wall and a second side wall when inserting a second component into the functional groove, so that the capillary effect is maximized in response to a soldering process and a reliable soldering can be ensured.

In the case of a further advantageous embodiment of the solution according to the invention it is provided that the functional groove has a rectangular-like cross section. The one first side wall and a second side wall are thereby connected via a front side. It can be provided that the first side wall and/or the second side wall are shorter than the front side.

In the case of an advantageous further development of the solution according to the invention it is provided that the first support groove and/or the second support groove each have a trapezoidal cross section. The cross section of the first support groove and/or of the second support groove is to be viewed transversely to its longitudinal expansion or transversely to its longitudinal direction of extension, respectively. The trapezoidal cross section of the first support groove and/or the second support groove can be formed as isosceles and symmetrical trapezoid. The trapezoidal cross section of the first support groove and/or the second support groove can be formed as rectangular trapezoid. The first support groove and/or the second support groove can have an essentially identical trapezoidal cross section. A flowing of a material portion of the component parallel to the first surface portion can be further reduced by means of the trapezoidal cross section.

In the case of a further advantageous embodiment of the solution according to the invention it is provided that the functional groove has a width, which is larger than the distance between the functional groove and the first support groove and/or the second support groove. The region, in which the embossings are carried out, can be minimized thereby.

In the case of an advantageous further development of the solution according to the invention it is provided that the first support groove and/or the second support groove have a width, which is smaller than a width of the functional groove. The region, in which the embossings are carried out, can be minimized thereby.

In the case of a further advantageous embodiment of the solution according to the invention it is provided that the component has a wall thickness, wherein a depth of the functional groove can correspond to up to 45%, in particular up to 40%, of the wall thickness. An optimum between possible tolerance compensation and mechanical resistance can be attained thereby.

In the case of an advantageous further development of the solution according to the invention it is provided that the functional groove has a width, which corresponds to at least a wall thickness of the component. It can be provided that the width of the functional groove is larger than the wall thickness of the component. Viewed in the cross section, the width of the functional groove can be determined by the distance between a first side wall and a second side wall.

In the case of a further advantageous embodiment of the solution according to the invention it is provided that the beginning of the embossing of the first support groove and/or of the second support groove is performed at a time before the beginning of the embossing of the functional groove. The functional groove can be produced in a particularly material-preserving manner thereby.

In the case of an advantageous further development of the solution according to the invention it is provided that the second surface portion remains free from embossment. The component can thereby be connected to a third component, in particular soldered, for example via the second surface portion.

In the case of a further advantageous embodiment of the solution according to the invention it is provided that the functional groove, the first support groove, and/or the second support groove are embossed into a planar and/or flat component, wherein the embossed component is subsequently bent at least in some sections. The parallelism of the side walls of the functional groove in the radius and/or in the bending portion and/or in the bending region is essentially maintained during a bending process. The component can thereby be bent, for example, into a U-shaped, trapezoidal or semicircular shape comprising an adapted radius, wherein the parallelism of the side walls of the function grooves in the radius and/or in the bending portion and/or in the bending region is maintained.

A method for bonding a first component to a second component by means of a substance-to-substance bond is further provided, in the case of which a first component comprising at least one embossment according to the invention is provided, wherein the first component forms a functional groove for partially receiving the second component. The second component is at least partially inserted into the functional groove in such a way that at least one solder gap or adhesive gap forms between the functional groove and the second component. It can also be provided that at least two solder gaps form between the functional groove and the second component. A soldering agent is introduced into the at least one solder gap or an adhesive is introduced into the at least one adhesive gap, so as to solder or to adhere the first component to the second component. The solder gap or adhesive gap can have a gap width of between 0.05 mm and 0.3 mm, preferably between 0.05 mm and 0.2 mm, particularly preferably between 0.05 mm and 0.1 mm.

A device comprising at least a first component and a second component is further provided, wherein the first component has an embossment according to the invention, and/or wherein the first component is soldered or adhered to the second component by means of the substance-to-substance bonding method according to the invention.

A device comprising at least a first component and a second component is further provided, wherein the first component has at least a first surface portion and a second surface portion, wherein the first surface portion and the second surface portion are located opposite one another and are spaced apart from one another, wherein the first component has a first support groove at least in some sections at the first surface portion, wherein the first component has a functional groove at the first surface portion, wherein the functional groove is arranged spaced apart from the first support groove at least in some sections, wherein the functional groove is formed for partially receiving a second component for a substance-to-substance bond, in particular for a soldering process, and/or during a soldering process or for an adhesive process and/or during an adhesive process.

The first component and/or the second component can be formed as sheet metal part. A sheet metal part of this type can have a flat sheet metal portion at least in some sections and/or a curved sheet metal portion at least in some sections. The wall thickness of the component, in particular of the sheet metal part, can be smaller than the length of the component and/or smaller than the width of the component.

In the case of an advantageous further development of the solution according to the invention it is provided that the first component has a second support groove at least in some sections at the first surface portion, that the first support groove and the second support groove are arranged spaced apart from one another at least in some sections, that the functional groove is arranged between the first support groove and the second support groove at least in some sections, and is arranged spaced apart from them.

In the case of an advantageous further development of the solution according to the invention it is provided that the first support groove and/or the second support groove and the functional groove are aligned essentially parallel to one another at least in some sections, and/or that, in the cross section, the functional groove has a first side wall and a second side wall, which are arranged spaced apart from one another and are aligned essentially parallel to one another, and/or that the functional groove has a rectangular cross section, and/or that the first support groove and/or the second support groove each have a trapezoidal cross section, and/or that the functional groove has a width, which is larger than the distance between the functional groove and the first support groove and/or the second support groove.

In the case of a further advantageous embodiment of the solution according to the invention it is provided that the first support groove and/or the second support groove have a width, which is smaller than a width of the functional groove, and/or that the first component has a wall thickness, wherein a depth of the functional groove can correspond to up to 45%, in particular up to 40%, of the wall thickness of the first component, and/or that the functional groove has a width, which corresponds at least to a wall thickness of the first component, and/or that the second surface portion of the first component remains free from embossment.

In the case of an advantageous further development of the solution according to the invention it is provided that the device is a heat exchanger or a component of a heat exchanger, in particular a box or a housing of a heat exchanger. It can be provided that a first component is a box of a heat exchanger and that the second component is a cover element, in particular a cover plate, which is soldered into the box.

In the case of a further advantageous embodiment of the solution according to the invention it is provided that the first component and/or the second component is made of aluminum.

Further important features and advantages of the invention follow from the subclaims, from the drawings, and from the corresponding figure description on the basis of the drawings.

It goes without saying that the above-mentioned features and the features, which will be described below, cannot only be used in the respective specified combination, but also in other combinations or alone, without leaving the scope of the present invention.

Preferred exemplary embodiments of the invention are illustrated in the drawings and will be described in more detail in the following description, whereby identical reference numerals refer to identical or similar or functionally identical components.

BRIEF DESCRIPTION OF THE DRAWINGS

In each case schematically.

DETAILED DESCRIPTION

Figure 1:
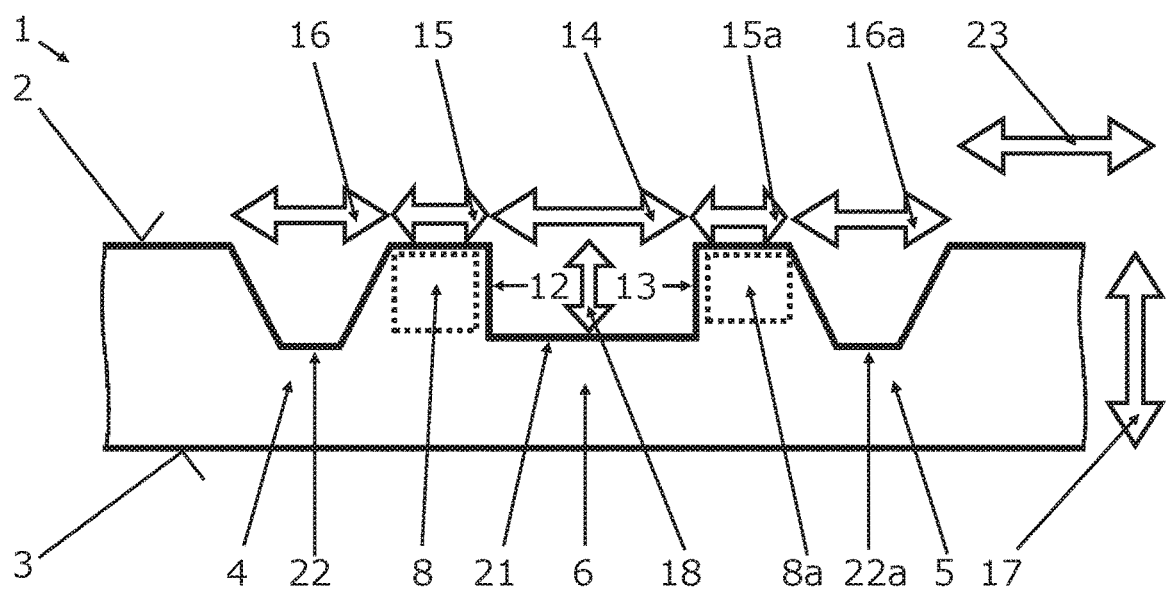
FIG. 1 shows a side view of a first component comprising an embossment according to the invention.

A first component 1 comprising an embossment according to the invention is illustrated in FIG. 1, wherein the first component has at least a first surface portion 2 and a second surface portion 3. Prior to an embossing process according to the invention, the first component 1 has a first surface portion 2, which can be formed similar to the illustrated second surface portion 3. The first surface portion 2 and the second surface portion 3 are located opposite one another and are spaced apart from one another. The distance between the first surface portion 2 and the second surface portion 3 outside of an embossment region or the grooves, respectively, defines the wall thickness 17.

A first support groove 4 and a second support groove 5 and a functional groove 6 is embossed into the first component 1 at the first surface portion 2 at least in some sections by means of the method according to the invention for embossing a component.

The first support groove 4 and the second support groove 5 are arranged spaced apart from one another at least in some sections. The functional groove 6 is arranged between the first support groove 4 and the second support groove 5 at least in some sections and is arranged spaced apart from them. The distance between the first support groove 4 and the functional groove 6 is illustrated by the arrow symbol 15. The distance between the second support groove 5 and the functional groove 7 is illustrated by the arrow symbol 15a.

The cross section of the first support groove 4 and of the second support groove 5 can be seen in FIG. 1, wherein both support grooves 4 and 5 have a trapezoidal cross section. The trapezoidal cross section is formed as isosceles trapezoid in FIG. 1, whereas the trapezoidal cross section of the two support grooves 4 and 5 is formed as rectangular trapezoid in an exemplary manner in FIG. 4.

The cross section of the first support groove 4 and of the second support groove 5 has a front side 22 or a front side 23, respectively, wherein these front sides 22 and 23 extend essentially parallel to a surface expansion direction 23. The surface expansion direction 23 is aligned essentially parallel to the first surface portion 2 and/or parallel to the second surface portion 3. The front side 22 and the one front side 23 are each connected to the first surface portion 2 via side surfaces, wherein these side surfaces are aligned obliquely to the surface expansion direction 23. These side surfaces can preferably draw an angle of 45° to the surface expansion direction 23. The width of the first support groove 4 and of the second support groove 5 is illustrated by the arrow symbol 16 or 16a, respectively.

The functional groove 6 has a rectangular cross section, which is limited or defined, respectively, by the first side wall 12, the second side wall 13, and the front side 21. The distance between the first surface portion 2 and the front side 21 can define a depth 18 of the functional groove 6. Viewed in the cross section, a width 14 of the functional groove 6 can be determined by the distance between the first side wall 12 and the second side wall 13.

The first support groove 4 and/or the second support groove 5 reduce a flowing of a material portion 8 and/or 8a of the first component 1 parallel to the first surface portion 2 during the embossing of the functional groove 6. An alignment of the first side wall 12 and of the second side wall 13 essentially parallel to one another can thus be attained.

Figure 2:
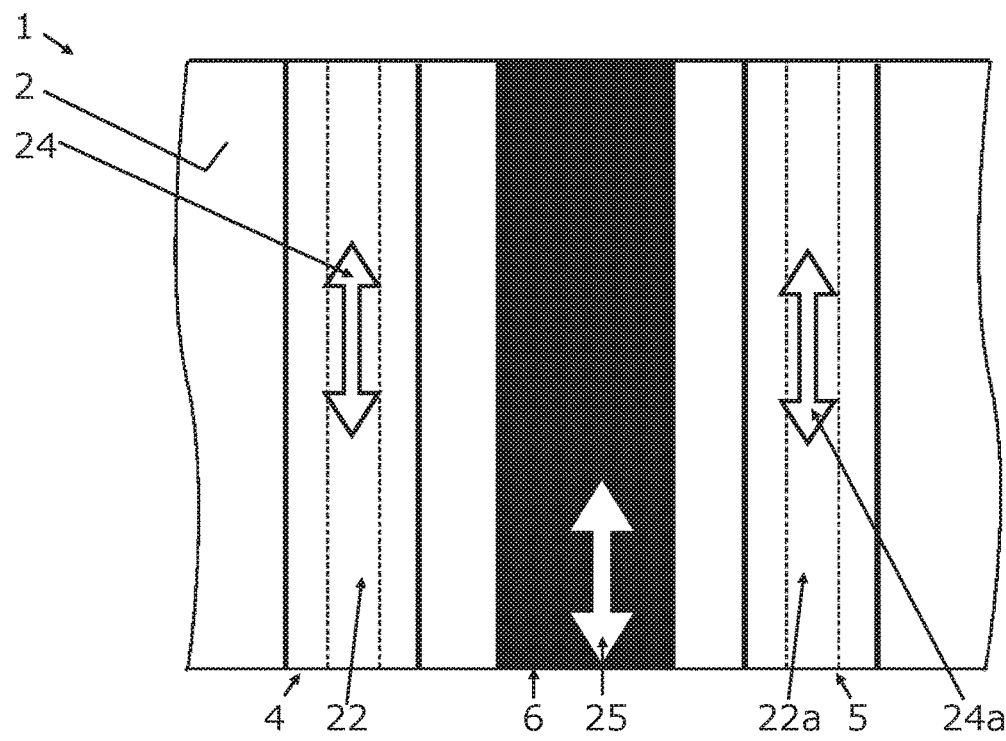
FIG. 2 shows a top view of the first component of FIG. 1.

As illustrated in FIG. 2, a longitudinal direction of extension 24 of the first support groove 4, a longitudinal direction of extension 24a of the second support groove 5, and a longitudinal direction of extension 25 of the functional groove 6 are aligned parallel to one another at least in some sections in the context of the production tolerances.

Figure 3:
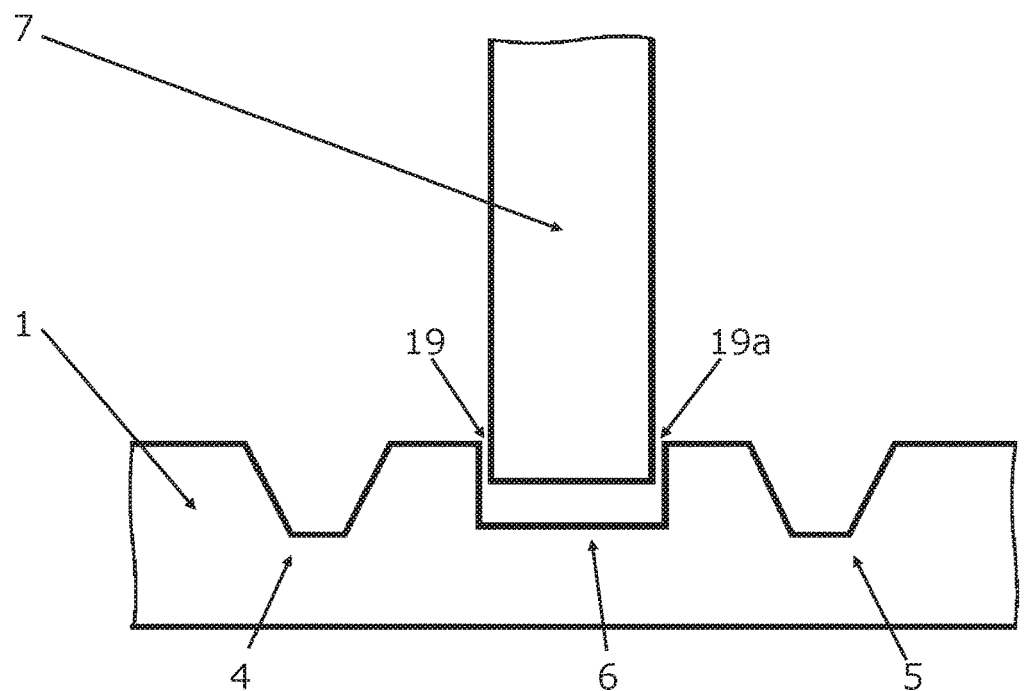
FIG. 3 shows a side view of a first component comprising an embossment according to the invention, and of a second component prior to a soldering process.

A second component 7 is shown in FIG. 3, which is inserted at least partially into the functional groove 6 in such a way that at least one solder gap 19 and a solder gap 19a is formed between the functional groove 6 and the second component 7. A soldering agent can subsequently be introduced into the at least one solder gap 19 in a soldering process, so as to solder the first component 1 to the second component 7.

Figure 4:
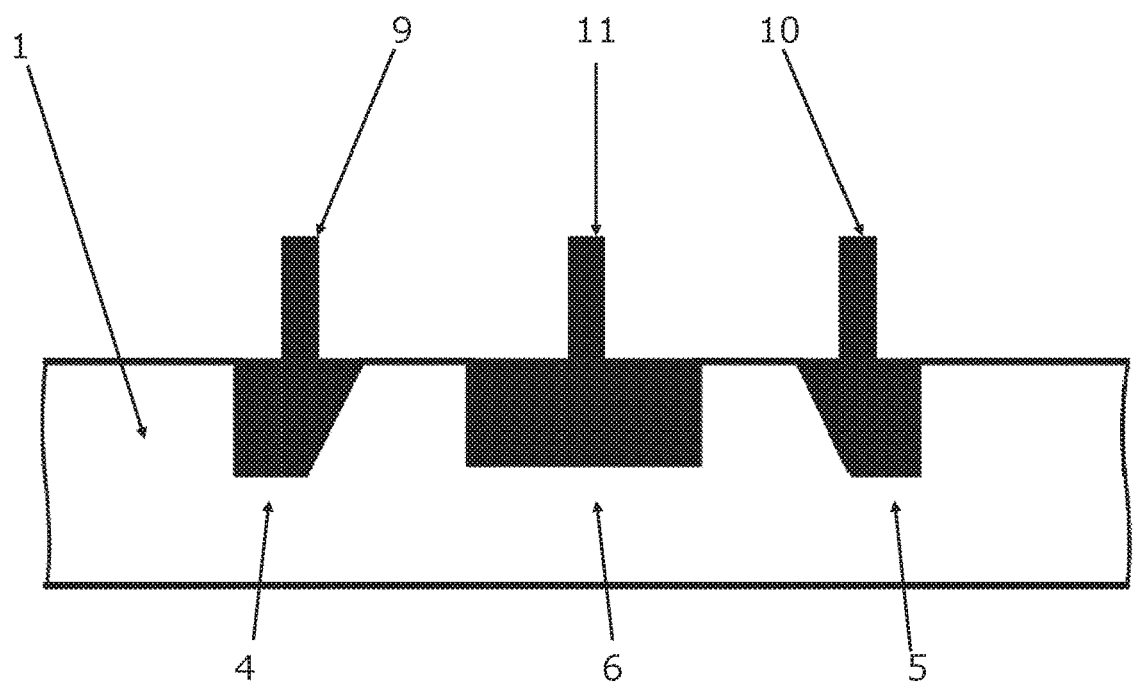
FIG. 4 shows a side view of a first component during an embossing.

It is illustrated in FIG. 4 that the embossing of the first support groove 4 is carried out by means of a first embossing tool portion 9, wherein the embossing of the second support groove 5 is carried out by means of a second embossing tool portion 10. The embossing of the functional groove 6 takes place by means of a third embossing tool portion 11. The first embossing tool portion 9 can be in the first support groove 4 during the embossing of the functional groove 6, whereas the second embossing tool portion 10 can be in the second support groove 5.

Figure 5:
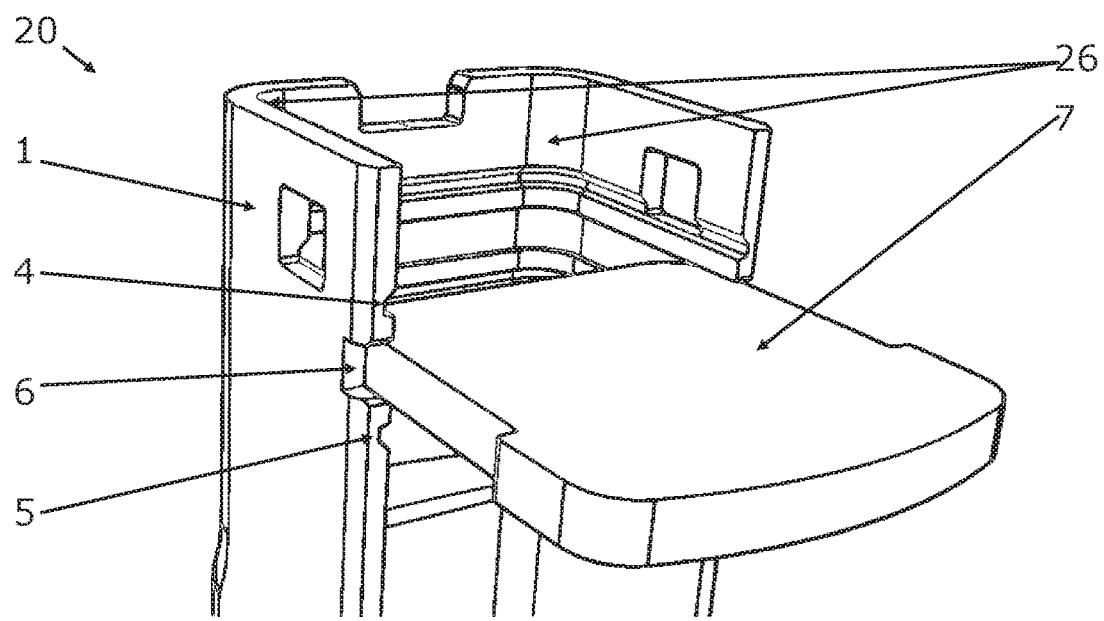
FIG. 5 shows a perspective view of a device according to the invention.

A device 20 comprising a first component 1 and a second component 2 is illustrated in FIG. 5, wherein the first component 1 has a circumferential embossment according to the invention comprising a first support groove 4, a second support groove 5, and a functional groove 6, wherein the second component 7 is inserted into the functional groove 6.

The first component 1 forms a partial portion of a box of a heat exchanger, wherein the second component 7 forms a cover plate.

The cover plate 7 is inserted into the functional groove 6 and is preferably soldered. The soldering preferably takes place along an upper and/or lower side of the cover plate 7 and the box 2. Due to the exact embossment of the functional groove and the relatively accurately defined thickness of the cover plate 7, a smallest possible solder gap can be ensured easily there. Tolerances of larger than 0.1 mm in the width of box 1 or cover plate 7 can thus be compensated without disadvantages for the solderability.

A first component 1 is illustrated in FIG. 5, in the case of which the first support groove 4, the second support groove 5, and the functional groove 6 were embossed, for example, while the first component 1 was present in a flat and/or planar design. According to the illustration of FIG. 5, the first component 1 was subsequently bent into a U-shaped, trapezoidal or semicircular shape comprising an adapted radius 26, wherein the parallelism of the first side wall 12 and of the second side wall 13 is maintained in the bending region with adapted radius 26.

The invention claimed is:

1. A method for embossing a component having at least a first surface portion and a second surface portion, the first surface portion and the second surface portion located opposite to one another and spaced apart from one another, the method comprising:
   embossing a first support groove into the component at least in some sections at the first surface portion,
   embossing a functional groove into the component at the first surface portion,
   wherein the functional groove is arranged spaced apart from the first support groove at least in some sections, and the first support groove is embossed into the component at the first surface portion with a cross sectional shape different from that of the functional groove to reduce a flowing of a material portion of the component parallel to the first surface portion during the embossing of the functional groove, and
   wherein embossing the functional groove includes forming the functional groove for partially receiving a second component for a substance-to-substance bond.

2. The method according to claim 1, further comprising:
   embossing a second support groove into the component at least in some sections at the first surface portion,
   wherein the first support groove and the second support groove are arranged spaced apart from one another at least in some sections, and
   wherein the functional groove is arranged between the first support groove and the second support groove at least in some sections and is arranged spaced apart from the first support groove and the second support groove.

3. The method according to claim 1, wherein at least one of:
   the functional groove is formed for partially receiving the second component for at least one of a soldering process and during a soldering process, and
   the functional groove is formed for partially receiving the second component for at least one of an adhesive process and during an adhesive process.

4. The method according to claim 1, wherein:
   a second support groove is embossed into the component at the first surface portion with a cross sectional shape different from that of the functional groove, and
   the second support groove reduces a flowing of a material portion of the component parallel to the first surface portion during the embossing of the functional groove.

5. The method according to claim 1, wherein at least one of the embossing of the first support groove takes place via a first embossing tool portion, and a second support groove is embossed into the component at the first surface portion via a second embossing tool portion,
   wherein the embossing of the functional groove takes place via a third embossing tool portion, and
   wherein the first embossing tool portion and the second embossing tool portion reduce a flowing of a material portion of the component parallel to the first surface portion during the embossing of the functional groove.

6. The method according to claim 5, wherein at least one of the first embossing tool portion is in the first support groove and the second embossing tool portion is in the second support groove during the embossing of the functional groove.

7. The method according to claim 1, wherein the functional groove and at least one of the first support groove and a second support groove embossed into the component at the first surface portion are aligned essentially parallel to one another at least in some sections.

8. The method according to claim 1, wherein the functional groove has a cross section provided by a first side wall and a second side wall, wherein the first side wall and the second side wall are arranged spaced apart from one another and are aligned essentially parallel to one another.

9. The method according to claim 1, wherein the functional groove has a rectangular cross section.

10. The method according to claim 1, wherein at least one of the first support groove and a second support groove embossed into the component at the first surface portion each have a trapezoidal cross section.

11. The method according to claim 1, wherein the functional groove has a width that is larger than a distance between the functional groove and at least one of the first support groove and a second support groove embossed into the component at the first surface portion.

12. The method according to claim 1, wherein at least one of the first support groove and a second support groove embossed into the component at the first surface portion have a respective width that is smaller than a width of the functional groove.

13. The method according to claim 1, wherein the component has a wall thickness, and wherein a depth of the functional groove corresponds to up to 45% of the wall thickness.

14. The method according to claim 1, wherein the functional groove has a width that corresponds to at least a wall thickness of the component.

15. The method according to claim 1, wherein at least one of a beginning of the embossing of the first support groove and a beginning of embossing a second support groove into the component at the first surface portion is performed at a time before beginning the embossing of the functional groove.

16. The method according to claim 1, wherein the second surface portion is free from embossment.

17. The method according to claim 1, wherein:
at least one of the functional groove, the first support groove, and a second support groove provided at the first surface portion are respectively embossed into at least one of a planar component and a flat component, and
wherein the at least one of the planar component and the flat component is subsequently bent at least in some sections after the embossing.

18. A method for connecting a first component to a second component via a substance-to-substance bond, comprising:
embossing a first support groove into the first component at a first surface portion, the first component having a second surface portion disposed opposite to and spaced apart from the first surface portion,
forming a functional groove in the first component for partially receiving the second component, wherein the functional groove is formed at the first surface portion spaced apart from the first support groove, and the first support groove is embossed into the component at the first surface portion with a cross sectional shape different from that of the functional groove to reduce a flowing of a material portion of the component parallel to the first surface portion during the embossing of the functional groove,
inserting the second component at least partially into the functional groove such that at least one solder gap or at least one adhesive gap forms between the functional groove and the second component, and
introducing a soldering agent into the at least one solder gap or an adhesive into the at least one adhesive gap to solder or adhere the first component to the second component.

19. The method according to claim 1, wherein the first support groove has a width that reduces in a direction towards the second surface portion.

20. The method according to claim 1, further comprising:
inserting the second component at least partially into the functional groove such that at least one solder gap or at least one adhesive gap forms between the functional groove and the second component, and
introducing a soldering agent into the at least one solder gap or an adhesive into the at least one adhesive gap to solder or adhere the first component to the second component.

\* \* \* \* \*